United States Patent
Culebro et al.

(10) Patent No.: US 9,445,112 B2
(45) Date of Patent: Sep. 13, 2016

(54) SECURE TRANSCODING OF VIDEO DATA

(71) Applicant: Microsoft Corporation, Redmond, WA (US)

(72) Inventors: Mario Vera Culebro, Mountain View, CA (US); Pradip Fatehpuria, San Jose, CA (US); Douglas Steedman, San Francisco, CA (US); Senthil Kumar Gnanasambandam, San Jose, CA (US); Toby Steele, Sandycove (IE); Hemant Malhotra, Newark, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 13/707,579

(22) Filed: Dec. 6, 2012

(65) Prior Publication Data

US 2014/0161196 A1    Jun. 12, 2014

(51) Int. Cl.
*H04L 29/06*    (2006.01)
*G06F 21/00*    (2013.01)
*H04N 19/40*    (2014.01)
*H04N 21/4408*    (2011.01)
(Continued)

(52) U.S. Cl.
CPC .......... *H04N 19/40* (2014.11); *H04N 21/2347* (2013.01); *H04N 21/4408* (2013.01); *H04N 21/440218* (2013.01)

(58) Field of Classification Search
CPC ............... H04N 19/40; H04N 1/4486; H04N 21/440218; H04N 21/2347; H04N 21/4408
See application file for complete search history.

(56) References Cited

U.S. PATENT DOCUMENTS

| | | | | |
|---|---|---|---|---|
| 5,991,410 A | * | 11/1999 | Albert | G06Q 20/0855 380/270 |
| 2006/0117379 A1 | * | 6/2006 | Bennett et al. | 726/3 |
| 2008/0025507 A1 | * | 1/2008 | Taylor | 380/201 |

(Continued)

FOREIGN PATENT DOCUMENTS

| WO | 2008/139335 A1 | 11/2008 | |
|---|---|---|---|
| WO | WO 2008139335 A1 * | 11/2008 | ............... H04L 9/00 |

OTHER PUBLICATIONS

Thomas, et al., "A Novel Secure H.264 Transcoder Using Selective Encryption", Retrieved at <<http://nguyendangbinh.org/Proceedings/ICIP/2007/pdfs/0400085.pdf>>, IEEE International Conference on Image Processing, ICIP 2007, Sep. 16, 2007, pp. 4.

(Continued)

*Primary Examiner* — Lisa Lewis
(74) *Attorney, Agent, or Firm* — Aaron Chatterjee; Judy Yee; Micky Minhas (57) ABSTRACT

A secure transcoder assembly features a secure data path where the related crypting and coding functions are secured in the secure data path. More specifically, during transcoding the ingress (received) encrypted video data is decrypted and copied from application memory (that is accessible to the application processor) to secure memory (that is inaccessible to the application processor) by security processor(s). Once in the secured memory, this video data is transcoded. The video data, now in its transcoded form, is re-encrypted by the security processor(s) during the transfer back to application memory for egress (continued transmission). The mode for the re-encrypting may be managed by the application processor via a crypto API, and the application processor may further feature an opaque handle on the data when it is passed to the secure region.

16 Claims, 5 Drawing Sheets

(51) Int. Cl.
*H04N 21/2347* (2011.01)
*H04N 21/4402* (2011.01)

(56) References Cited

U.S. PATENT DOCUMENTS

| | | | |
|---|---|---|---|
| 2008/0263621 | A1 | 10/2008 | Austerlitz et al. |
| 2010/0299516 | A1* | 11/2010 | Hwang et al. ............... 713/150 |
| 2011/0145926 | A1* | 6/2011 | Dalcher et al. ............... 726/26 |
| 2011/0235801 | A1 | 9/2011 | Peterka et al. |
| 2012/0159146 | A1 | 6/2012 | Kamieniecki et al. |
| 2012/0224688 | A1* | 9/2012 | Rodgers et al. ............... 380/203 |
| 2013/0100913 | A1* | 4/2013 | Scherer et al. ............... 370/329 |
| 2014/0029747 | A1* | 1/2014 | Kamieniecki et al. ......... 380/28 |
| 2014/0281529 | A1* | 9/2014 | Epp et al. ..................... 713/168 |

OTHER PUBLICATIONS

Wee, et al., "Secure Scalable Video Streaming for Wireless Networks", Retrieved at <<http://www.hpl.hp.com/personal/John_Apostolopoulos/papers/SecureScalableStreaming_WirelessNetworks_ICASSP01.pdf>>, IEEE International Conference on Acoustics, Speech, and Signal Processing, May 7, 2001, pp. 4.

Chang, et al., "Secure Transcoding of Internet Content", Retrieved at <<http://citeseerx.ist.psu.edu/viewdoc/download?doi=10.1.1.5.6178&rep=rep1&type=pdf>>, International Workshop on Intelligent Multimedia Computing and Networking (IMMCN) 2002, Mar. 9, 2002, pp. 4.

Mou, et al., "A secure media streaming mechanism combining encryption, authentication, and transcoding", Retrieved at <<http://www.jdl.ac.cn/doc/2009/A%20Secure%20Media%20Streaming%20Mechanism%20Combining%20Encryption,%20Authentication,%20and%20Transcoding.pdff>>, In Journal on Signal Processing: Image Communication, vol. 24, Issue 10, Nov. 2009, pp. 9.

Hellwagner, et al., "Efficient In-Network Adaptation of Encrypted H.264/SVC Content", Retrieved at <<http://www-itec.uni-klu.ac.at/publications/mmc/Elsevier_Efficient_In-Network_Adaptation.pdf>>, In Journal on Signal Processing: Image Communication, vol. 24, Issue 9, Oct. 2009, pp. 39.

Thomas, et al., "A Novel H.264 Svc Encryption Scheme for Secure Bit-Rate Transcoding", Retrieved at <<http://rose.bris.ac.uk/bitstream/handle/1983/1552/thomas_IEEE_PCS_2009.pdf?sequence=1>>, In the Conference on Picture Coding Symposium, PCS 2009, May 6, 2009, pp. 4.

"International Search Report & Written Opinion for PCT Patent Application No. PCT/US2013/072894", Mailed Date: Mar. 5, 2014, Filed Date: Dec. 3, 2013, 12 Pages.

Sun, et al., "An Overview of Scalable Video Streaming", Published in Wireless Communications and Mobile Computing, Feb. 2007, 37 Pages.

* cited by examiner

SECURE TRANSCODING OF VIDEO DATA

BACKGROUND

The continued proliferation of multimedia technologies has led to exponential growth in the number and variety of devices capable of processing digital video data. Similarly, the ease with which video data may be copied and distributed without authorization has also increased, which in turn has led to various copy protection strategies and improved Digital Rights Management (DRM) techniques. The inherent challenges of efficient storage and distribution of video data, in turn, have inspired much innovation in the area of scalable video coding and video transcoding.

In various applications, such as digital broadcast and cable television (TV) systems, video data is normally encrypted before transmission for security (i.e., to prevent unauthorized use of the content). Near the receiving end of these transmissions, such as in-home video redistribution, it is common to bit-rate transcode the video bitstream for efficiency (i.e., to achieve optimum utilization of available bandwidth). "Transcoding" is the direct digital-to-digital data conversion from one encoded format to another encoded format (i.e., decoding to an intermediate form and then re-encoding) such as, for example, from a high-quality large-size format to a lower-quality smaller-size format. However, when a video signal is decrypted, transcoded (from the original encoded format to the target encoded format), and then re-encrypted to complete transmission, there is a period of time where the video data is relatively unsecure (i.e., unencrypted) and vulnerable to unauthorized use.

While some transcoding solutions attempt to mitigate this risk by performing transcoding using only trusted and tamper-proof devices, such devices are relatively expensive due to the increased cost of manufacturing inherent to such devices, and these increased costs of production have limited the widespread utilization of such trusted and tamper-proof devices. Accordingly, there is a need for a transcoding approach that maintains security of the video data during the transcoding process.

SUMMARY

Various implementations disclosed herein features secure transcoding using a secure data path where the related crypting and coding functions are also secured in the secure data path. More specifically, during transcoding, the ingress (received) encrypted video data is decrypted during the transfer from application memory (that is accessible to the application processor) to secure memory (that is inaccessible to the application processor) by security processor(s). Once in the secured memory, this video data is then transcoded. The video data, now in its transcoded form, is then encrypted during the transfer back to application memory for egress (continued transmission) by the security processor(s).

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Various audio-video (A/V) container format standards—such as the Protected Interoperable File Format (PIFF), Common File Format (CFF), and Common ENCryption format (CENC), for example—specify the subsample encryption technique that is used for encrypting the corresponding content. These various encryption techniques employ a common approach wherein a sample of video data is divided into one or more subsamples, and each of these subsamples may have an unencrypted part followed by an encrypted part. Because of the number of different format standards that are in common use at any given time, transcoding solutions are often designed to work with several of these different formats. As such, multi-format transcoders generally feature flexible designs that are compatible with the multiple encryption format options.

In addition, recent advances in multimedia technologies have led to a growth in the varieties of devices capable of handling digital video data, and video data is often encrypted before transmission for security. Because of bandwidth constraints, however, it is often necessary to transcode the bitstream to achieve optimum utilization, and the typical approach of decoding a video data signal to be transcoded and then re-encrypting the data presents a security vulnerability. Indeed, the ease of unauthorized copying and distribution of video data has led to various copy protection strategies and various Digital Rights Management solutions. With regard to wireless video transmissions, secure systems for distributing scalable H.264 data are known, but these systems largely employ expensive specialized hardware. In contrast, no solutions are known that integrate directly into the transcoder architecture to allow secure transcoding of data.

Figure 1:
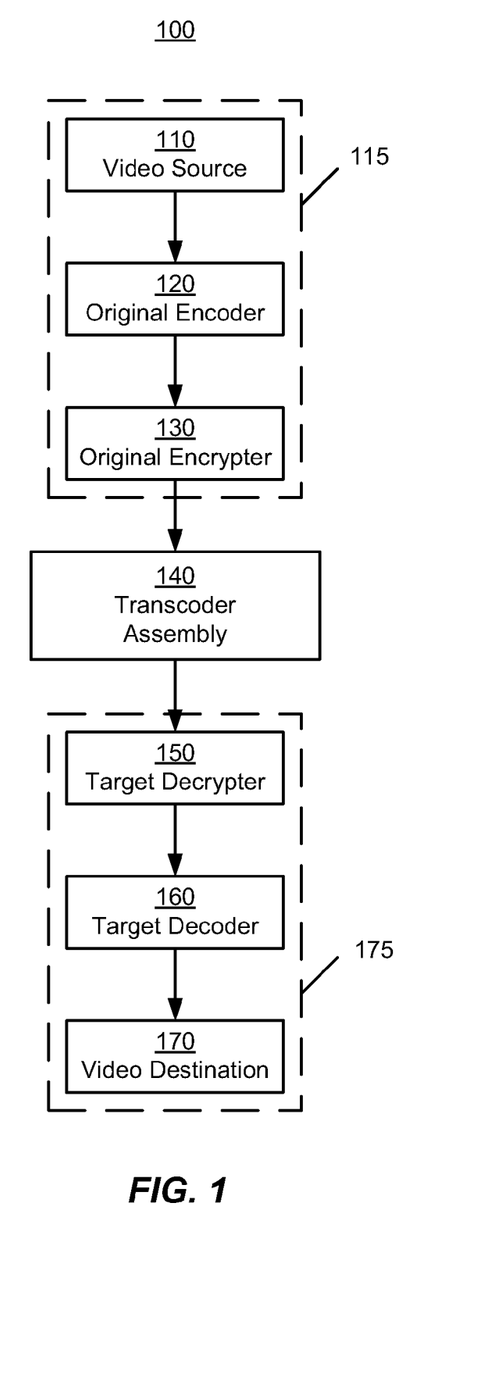
FIG. 1 is a block diagram representative of an exemplary video broadcast and viewing system in which various transcoder implementations disclosed herein may be utilized.

FIG. 1 is a block diagram representative of an exemplary video broadcast and viewing system 100 in which various transcoder implementations disclosed herein may be utilized. In the figure, a video source 110 provides video data to an original encoder 120 that produces encoded video data (for efficiency) using one of the A/V container format standards. The encoded video data is then processed by an original encrypter 130 that encrypts the encoded video data (for security) to produce encrypted video data. In this form, the encrypted video data may then be transmitted over a network from the protected source environment 115 corresponding to the video source 110 (e.g., a broadcast television center, a wireless video content provider, etc.) to the protected destination environment 175 corresponding to one or more intended video destinations 170 (i.e., a television display, a personal media player, etc.).

To perform the desired transcoding, the encrypted video may then be received from the protected source environment 115 at the transcoder assembly 140. The transcoder assembly 140 transcodes the encrypted video data in the original format to produce encrypted video data in the desired format. This resultant encrypted video data is then provided to the protected destination environment 175 where it is received by a target decrypter 150 to decrypt the video data into unencrypted (but still encoded) video data. This encoded video data is then further processed by the target decoder 160 to provide the video data in an unencoded format to the video destination 170 for intended use (e.g., for television display).

Figure 2:
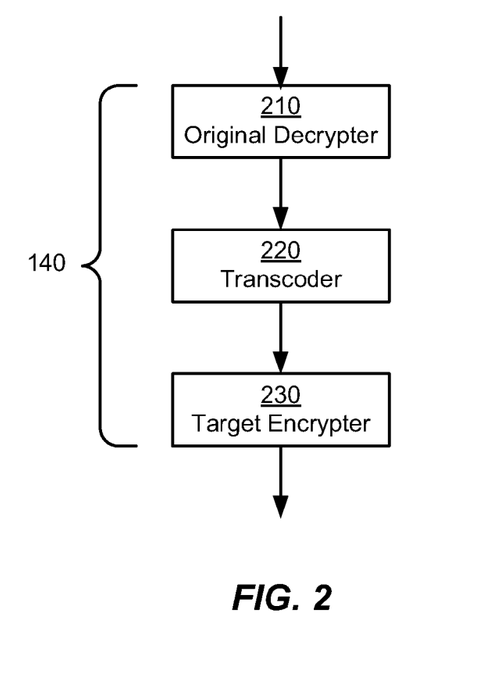
FIG. 2 is a block diagram representative of an exemplary transcoder assembly of FIG. 1 in which various transcoder implementations disclosed herein may be utilized.

FIG. 2 is a block diagram representative of an exemplary transcoder assembly 140 of FIG. 1 in which various transcoder implementations disclosed herein may be utilized. Referring to FIG. 2 along with FIG. 1, the encrypted encoded video data received from the protected source environment 115 is received and processed by an original decrypter 210 to decrypt the video data into unencrypted video data still encoded in an original A/V container format. This video data is then processed by a transcoder 220 that "transcodes" the video data from the original A/V container format to the target A/V container format. The transcoded video data is then re-encrypted by the target encrypter 230 (for security) to produce encrypted video data that is now in the target A/V container format for continued transmission to the protected destination environment 175.

Typical transcoding "crypting" and "coding" processes are often implemented using two different dedicated hardware processors, a crypting processor (for decryption and re-encryption) and a coding processor (for transcoding) respectively. These specialized processors, in turn, are controlled by an application processor. In order to implement a flexible subsample encryption solution that can support multiple encryption techniques, it is the application processor that is typically used to determine the regions of encryption for each sample. However, one of the consequences of this approach is that it provides a very lucrative attack vector whereby malicious code could be used to manipulate the memory used by the application processor to store the encrypted and unencrypted subsample regions. For example, such malicious code could cause an application processor to leave entire samples in the clear (i.e., unencrypted and accessible in memory) so that the content may be readily accessed, copied, and so forth. Other potential attack vectors are also known and similarly need to be protected against during the transcoding process.

Various implementations disclosed herein features secure transcoding using a secure data path where the related crypting and coding functions are also secured in the secure data path. More specifically, during transcoding, the ingress (received) encrypted video data is decrypted from application memory (that is accessible to, or selectable by, the application processor) to secure memory (that is inaccessible to, or not selectable by, the application processor) by security processor(s). The video data is then securely transcoded by the transcode processor. The video data, now in its transcoded form, is then re-encrypted during the transfer back to application memory for egress (continued transmission).

In the context of wireless video content delivery, and with regard to the detailed description that follows, it should be noted that a hardware abstraction layer (HAL) is an abstraction layer implemented in software that resides between the physical hardware of a computer (or computerized device) and the software that runs on that computer (or device). As known to skilled artisans, the function of the HAL is to hide differences in hardware from most of the operating system kernel, so that most of the kernel-mode code does not need to be changed to run on systems with different hardware.

Similarly, skilled artisans are also familiar with the Network Abstraction Layer (NAL) that is a part of the H.264/AVC Video Coding Standard, the main objective of which is the provision of a "network-friendly" video representation addressing both "conversational" (video telephony) and "non-conversational" (storage, broadcast, or streaming) applications. In NAL, encoded video data is organized into NAL units, each of which is effectively a packet that contains an integer number of bytes. The first byte of each NAL unit is a header byte that contains an indication of the type of data in the NAL unit, and the remaining bytes contain payload data of the type indicated by the header. The NAL unit structure definition specifies a generic format for use in both packet-oriented and bitstream-oriented transport systems, and a series of NAL units generated by an encoder may be referred to herein as a "NAL unit stream."

Figure 3:
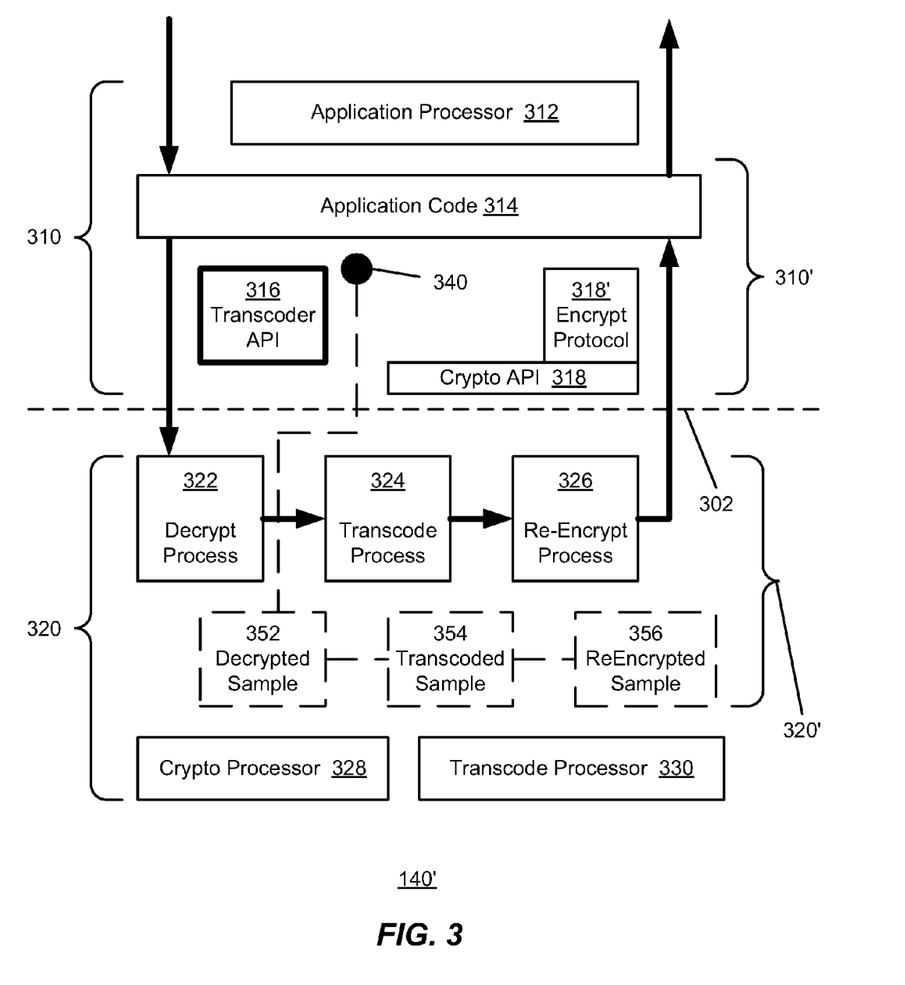
FIG. 3 is a modified block diagram depicting video data flow through a transcoder assembly representative of the various implementations described herein.

For the various implementations disclosed herein, processing the video data may be distributed between the application processor and the secure processor(s), i.e., the transcode (or coding) processor and a crypto (or crypting) processor. FIG. 3 (described below) depicts a representative data flow for several such implementations. Moreover, for certain implementations the encryption may utilize a HAL cryptographic standard and partly run on the application processor to control encryption commands but never exposes to the application processor the unencrypted video data (and associated metadata which controls the subsample regions). Instead, the application processor is only given opaque handles for the encrypted video data that the application processor uses to transfer the in-process video data between the different modules along the entire transcoder processing pipeline, whereas the data structures referred to by these opaque handles are only understood by the secure processor(s).

In operation, the various implementations herein disclosed may use metadata that is accessible by the application processor to indicate one of several different processing options. For example, this metadata may comprise fields corresponding to specific processing "modes" corresponding to the method of encryption used for the sample, the identification for the sample, the number of subsamples in the sample (if any), and the subsamples array (if any), wherein each subsample may comprise a range of zero or more bytes of unencrypted data followed by a range of zero or more bytes of encrypted data.

Accordingly, several different modes (or "mode indicators") may be available and may include (but are not necessarily limited to) the following: (a) "passthru" mode, where the video data is not encrypted and the transcoded video data is to be returned "in the clear" (unencrypted); (b) "full" mode, where the entire sample is encrypted and no subsamples are defined; (c) "CENC" (common encryption)

mode, where the sample is composed of subsamples each comprising a fixed-length unencrypted header followed by encrypted video content; and (d) "CFF" (common file format) mode, where the sample is composed of subsamples each comprising a variable-length unencrypted header followed by a variable number of encrypted video content "blocks" of a fixed length (e.g., sixteen bytes each).

FIG. 3 is a modified block diagram depicting a video data flow through a transcoder assembly 140' representative of the various implementations described herein. Referring to FIG. 3, the transcoder assembly 140' comprises an application region 310 and a secure region 320 (divided by the dashed line 302 shown for illustrative purposes only). The application region 310 is accessible by an application processor 312 executing application code 314 residing in application memory 310'. The application region also comprises a transcoder API (application programming interface) 316, a crypto API 318, and an encryption protocol 318' corresponding to the application code 314 executed by the application processor 312. In addition, the application region 310 has an opaque handle 340 to the video data sample 350 (not shown here but illustrated in FIGS. 5, 6, and 7) being progressively transformed (as shown as 352, 354, and 356) as it is transcoded (shown as dashed lines connecting 340 to 352, 354, and 356).

The transcoder assembly 140' further comprises a secure region 320 that is inaccessible to the application processor 312 and components thereof illustrated in the application region 310 except for the opaque handle 340 that remains associated with the video data throughout processing (e.g., 352, 354, and 356). This secure region 320 comprises a decryption process 322, a transform process 324, and a re-encryption process 326 that correspond to the crypto processor 328 and transcode processor 330 accordingly, these latter processors being distinct and separate from the application processor 312 (although may be perceived collectively as a single processing unit at a higher level of abstraction). Of course, skilled artisans will appreciate that alternative implementations may feature only a single processor (i.e., a "secure processor") that is used for all of the secure region processing, and that other alternative implementations may feature more than two processors. In addition, these various processors (e.g., 312, 328, and 330) may be collectively viewed or implemented in a variety of different fashions (using different processing cores, for example) while still conceptually constituting a single processing unit (such as processing unit 502 of FIG. 8 discussed further herein, wherein this processing unit may comprise both application and secure processors). The secure region further comprises secure memory 320' that, again, is inaccessible to the components in the application region 310. Also shown in the secure region 320 of FIG. 3 are data structures represented by dashed boxes (e.g., 352, 354, and 356) and described in more detail in FIGS. 5, 6, and 7.

Figure 4:
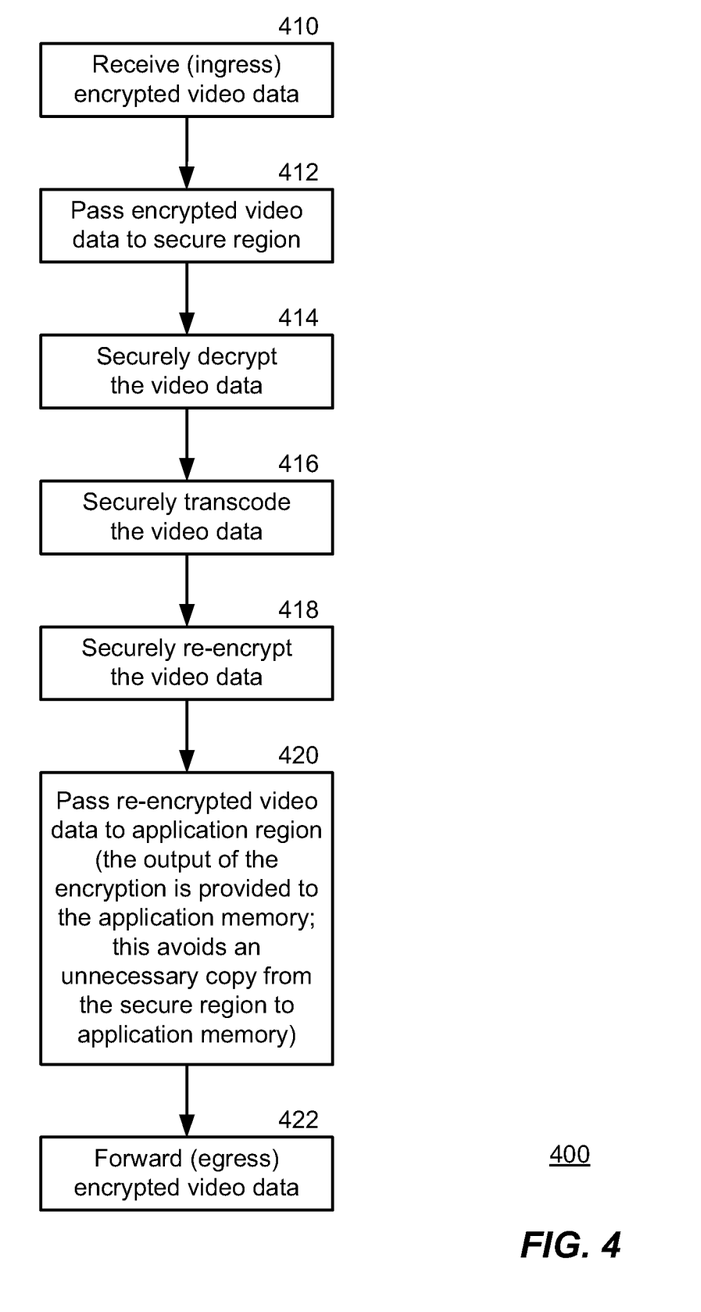
FIG. 4 is a process flow diagram depicting video data processing through a transcoder assembly in accordance with the data flow of FIG. 3 and is likewise representative of the various implementations described herein.

FIG. 4 is a process flow diagram 400 depicting video data processing through a transcoder assembly 140' in accordance with the data flow of FIG. 3 and is likewise representative of the various implementations described herein. At 410 the ingress video data—which is both encoded and encrypted and corresponding to the output of the protected source environment 115 of FIG. 1—is received by the application region 310 and, more specifically, by the application code 314 executing on the application processor 312 in the application region 310 of the transcoder assembly 140'. However, because the video data is encrypted (for security), the application code 314 is prevented from further processing the video data in the application region 310. Accordingly, at 412 the application code 314 then calls the crypto API 318 to effectively pass the encrypted video data to the secure region 320 by causing the encrypted video code to be processed from the application memory 310' to the secured memory 320' using the decrypt process 322 (or using a similar approach that might instead copy the encrypted data from application memory to secure memory before processing it using decrypt process 322).

At 414, the decryption process 322 securely decrypts the video data, forming decrypted sample 352. At 416, the transform process 324 (via the transcoder API 316) securely transcodes the video data (decrypted sample 352) from its original encoding to its target encoding, thereby forming transcoded sample 354. At 418, the video data (now in its new encoded format) is re-encrypted (via the crypto API 318) by the re-encryption process 326 to form the re-encrypted sample 356.

At 420, the re-encrypted video data is then passed back to the application region 310 (i.e., processed from the secure memory 320' to the application memory 310' by the re-encrypt process 326, for example) where it is once again accessible to the application code 314 in its new encoded form and encrypted (for security). At 422, the application code 314 then egresses the resultant (transcoded and encrypted) video data to the protected destination environment 175 of FIG. 1.

Stated differently, the process (for at least some select implementations) may be characterized as (1) ingressing encrypted video data in a first encoded format to an application region of a transcoder assembly; (2) passing a mode indicator from the application region to the secure region; (3) decrypting the encrypted video data in the first encoded format from the application region to a secure region that is inaccessible from the application region in response to the mode indicator; (4) transcoding the video data from the first encoded format to a second encoded format in the secure region; (5) re-encrypting the video data in the second encoded format from the secure region to the application region in response to the mode indicator; and (6) egressing the encrypted video data in the second encoded format. It should also be noted that, for decrypting the encrypted video data, a secure processor of the secure region may be used to input the encrypted video data directly from the application memory of the application region and, through the decrypt process, output decrypted video data directly to the secured memory of the secured region. Likewise, for re-encrypting the video data after transcoding (via the transcode processor running the transcode process), a secure processor of the secure region may be used to input the decrypted video data from the secured memory of the secure region and, through the re-encrypt process, output re-encrypted video data directly to the application memory of the application region.

Figure 5:
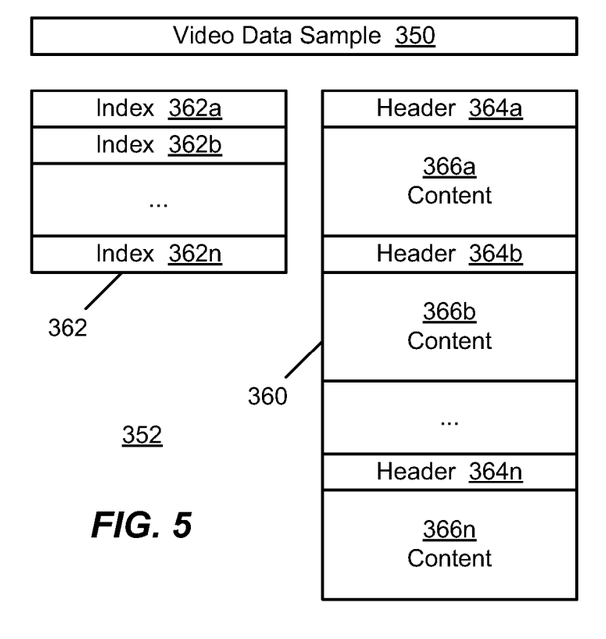
FIGS. 5, 6, and 7 are block diagrams illustrating the changing structure of the iterative transformation of samples as shown in FIG. 3 and representative of several implementations disclosed herein.
Figure 6:
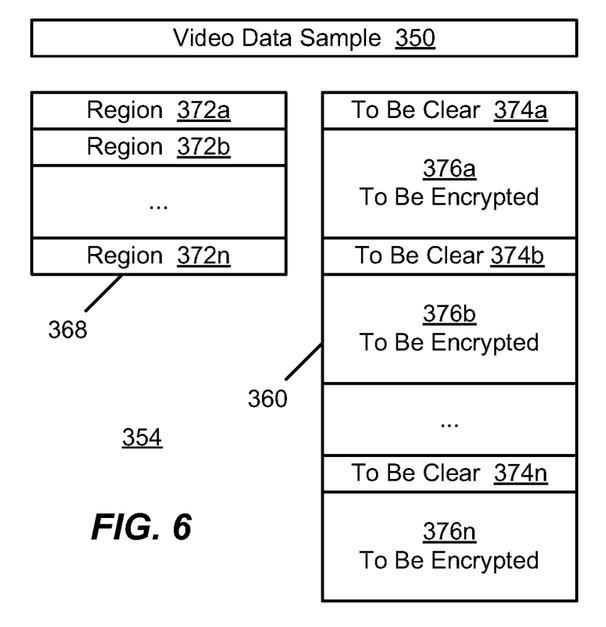
Figure 7:
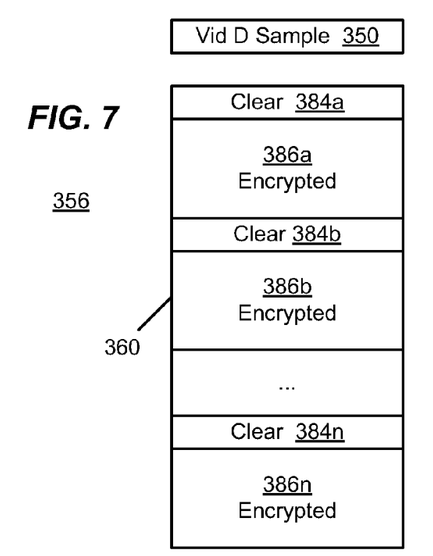

FIGS. 5, 6, and 7 are block diagrams illustrating the changing structure of the iterative transformation of samples 352, 354, and 356 respectively as shown in FIG. 3 and representative of several implementations disclosed herein.

In FIG. 5, the video data sample 350—which can only be referred to atomically from the application region 310 via the opaque handle 340—is shown as decrypted by the decryption process 322 to form unencrypted (but still encoded) video data 360.

In FIG. 6, the video data sample 350—which can still only be referred to atomically from the application region 310 via the opaque handle 340—is shown as transcoded by the transform process 324 to form a list of regions 368, an index table 362, and unencrypted (but now transcoded) video data 360. The list of regions 368 comprises multiple regions 372a, 372b, ..., 372n corresponding to regions in the video data 360 and indicating whether each said region is to be "clear" (unencrypted) such as region 374a for example, or encrypted (i.e., re-encrypted in response to the mode indicated and passed to it by the application processor 312 via the application code 314 utilizing the crypto API 318 of FIG. 3) such as region 376a for example. The index table 362 comprises multiple indexes 362a, 362b, ..., 362n corresponding to subsamples in the video data 360. Each subsample in turn comprises header and video content such as, for example, header 364a and content 366a corresponding to index 362a.

In FIG. 7, the video data 360—which, again, has been referred to only atomically from the application region 310 via the opaque handle 340—is shown as re-encrypted (in accordance with the encryption protocol in response to the mode indicated and passed to the re-encryption process 326 by the application processor 312 via the application code 314 utilizing the crypto API 318 of FIG. 3), that is, where the regions that were designed to be encrypted (e.g., region 376a of FIG. 6) are re-encrypted (e.g., region 386a) by the re-encryption process 326, and the regions that are to be "clear" or unencrypted (e.g., region 374a of FIG. 6) are not encrypted (e.g., region 384a). This resultant video data 350, now transcoded and with the content re-encrypted, is then passed back to the application region 310.

To enhance security of the resultant video data, certain implementations disclosed herein may also implement one or more of the following additional features. To prevent a potential vulnerability in the case where encryption and decryption are the same operation, the fact that the decryption process 322 and re-encryption processes 326 used for the transcoding process 324 are both performed in the secure region 320, the initialization vector for encryption is selected securely by the secure region 320 and can only be read by the application region 310 once it has been used for encryption but cannot be chosen or selected by the application region to enable unauthorized decryption. To prevent the clear portions of the resultant video data viewable in the application region 310 to be used to determine relative offsets for where the unencrypted equivalent may be found in the secure region 320, the secure region 320 may employ memory management techniques that separately "sandbox" the data to be encrypted from the data to be left in the clear, thereby eliminating any relative references of where the to-be-encrypted data may reside in the secure memory 320' relative to the data that is to be left clear.

In addition, "sandboxing" may be utilized for different data streams, with the processing for each stream occurring in its own sandbox in order to protect all data structures (index tables, list of subsample regions, etc.) used in the processing. Such a sandbox technique provides additional protection because an attacker cannot mix-and-match lists of regions for one stream with another stream. For example, if the mode for one stream is "passthru" (i.e. output should be unencrypted) and the mode for a second stream is CENC (having unencrypted and encrypted regions), then an attacker might be able to mix-and-match data structures, that is, it could re-use data structures of the first "passthru" stream to make the second stream unencrypted at the egress as well. Sandboxing each stream separately would prevent this from happening.

Figure 8:
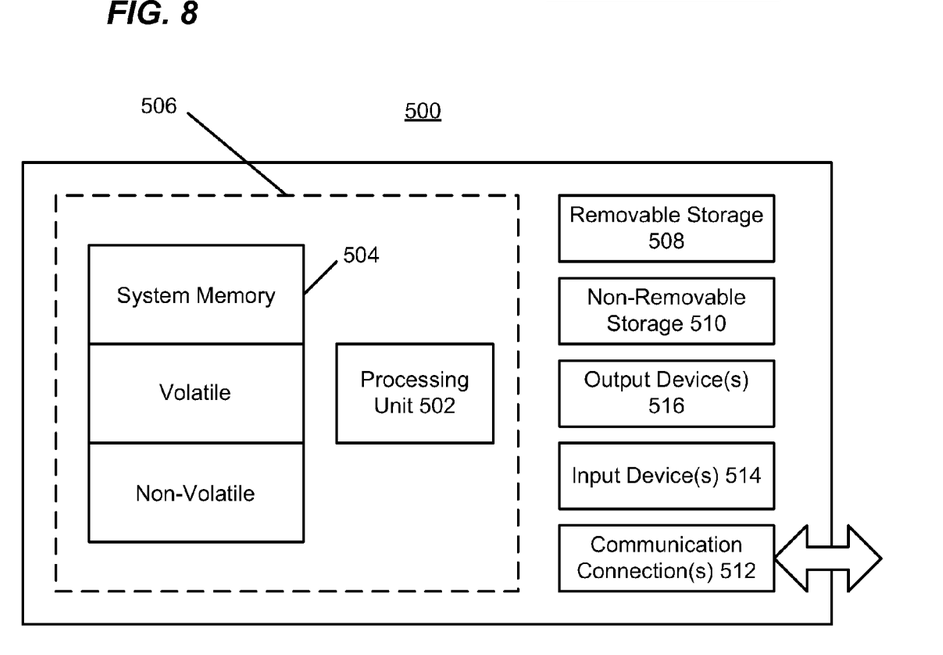
FIG. 8 is a block diagram of an example computing environment that may be used in conjunction with example implementations and aspects.

FIG. 8 is a block diagram of an example computing environment that may be used in conjunction with example implementations and aspects. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 8 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 8 by removable storage 508 and non-removable storage 510.

Computing device 500 typically includes a variety of computer readable media. Computer readable media can be any available media that can be accessed by device 500 and include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well-known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device configured to securely transcode video data, the device comprising:
    an application region configured to:
        ingress encrypted video data in a first encoded format, and
        egress encrypted video data in a second encoded format, wherein the video data comprises a plurality of video data regions; and
    a secure region inaccessible from the application region, the secure region configured to:
        receive the encrypted video data in the first encoded format from the application region,
        decrypt the video data in the first encoded format,
        transcode the video data to the second encoded format resulting in a transcoded sample, wherein the transcoded sample comprises the video data transcoded to the second encoded format, a list comprising, for each video data region of the plurality of video data regions, an indicator of whether that video data region is to be encrypted or unencrypted, and an index table comprising at least one index and at least one subsample of video data comprising a header and a content,
        re-encrypt the video data in the second encoded format in accordance with the list of the transcoded sample, wherein re-encrypting the video data in the second encoded format in the secure region results in a re-encrypted sample, the re-encrypted sample comprising at least one encrypted video data region of the plurality of video data regions, and
        send the encrypted video data in the second encoded format to the application region.

2. The device of claim 1, wherein the application region comprises at least one application processor, and wherein the secure region comprises at least one secure processor.

3. The device of claim 2, wherein the at least one secure processor comprises a transcode processor and a crypto processor.

4. The device of claim 2, wherein the application region further comprises a transcoder application programming interface (API) configured to cause the encrypted video data in the first encoded format residing in an application memory of the application region to be copied to a secured memory of the secured region that is not accessible to the application region.

5. The device of claim 2, wherein the application region further comprises a crypto application programming interface (API) configured to determine a mode corresponding to the second encoded format which the encrypted video data in the first video format will be re-encrypted into by the secure region.

6. The device of claim 1, wherein the application region further comprises an opaque handle corresponding to the video data while the video data is being processed in the secured region.

7. The device of claim 1, wherein the secure region performs a decryption process for forming a decrypted sample from the encrypted video data, and a re-encryption process for forming the re-encrypted sample from the transcoded sample.

8. A method for securely transcoding video data, the method comprising:
    ingressing encrypted video data in a first encoded format to an application region of a transcoder assembly, wherein the video data comprises a plurality of video data regions;
    passing a mode indicator from the application region to a secure region of the transcoder assembly, the secure region inaccessible from the application region;
    passing the encrypted video data in the first encoded format from the application region to the secure region;

decrypting the encrypted video data in the first encoded format based at least on the mode indicator;

transcoding the video data from the first encoded format to a second encoded format in the secure region resulting in a transcoded sample, wherein the transcoded sample comprises the video data transcoded to the second encoded format, a list comprising, for each video data region of the plurality of video data regions, an indicator of whether that video data region is to be encrypted or unencrypted, and an index table comprising at least one index and at least one subsample of video data comprising a header and a content;

re-encrypting the video data in the second encoded format based at least on the mode indicator in accordance with the list of the transcoded sample, wherein re-encrypting the video data in the second encoded format in the secure region results in a re-encrypted sample, the re-encrypted sample comprising at least one encrypted video data region of the plurality of video data regions;

passing the re-encrypted video data in the second encoded format from the secure region to the application region; and egressing the encrypted video data in the second encoded format.

9. The device of claim 8, wherein passing the encrypted video data from the application region to the secure region and decrypting the encrypted video data comprises a secure processor of the secure region inputting the encrypted video data from an application memory of the application region and outputting decrypted video data to a secured memory of the secured region.

10. The device of claim 8, wherein passing the re-encrypted video data from the secure region to the application region and re-encrypting the video data comprises a secure processor of the secure region inputting the decrypted video data from a secured memory of the secure region and outputting re-encrypted video data to an application memory of the application region.

11. The method of claim 8, wherein decrypting the video data in the first encoded format in the secure region results in a decrypted sample.

12. The method of claim 8, wherein the encrypted video data was formed using a symmetric key, and wherein an initialization vector for decrypting and subsequently re-encrypting the video data is selected in the secure region and is not accessible to the application region.

13. The method of claim 8, wherein the video data is maintained in a first sandbox of secure memory in the secure region separate from a second sandbox of memory in the secure region in which different video data to be encrypted is maintained.

14. A computer-readable storage device comprising computer-readable instructions for securely processing video data in a transcoder assembly, the computer-readable instructions comprising instructions that cause a first processor operating in an application region of the transcoder assembly to:

ingress encrypted video data encoded in a first format, wherein the video data comprises a plurality of video data regions;

pass the encrypted video data to a secure region of the transcoder assembly to which the first processor does not have access;

maintain an opaque handle on the encrypted video data passed to the secure region; and egress the encrypted video data encoded in a second format after it has been returned by the secured region, wherein the computer-readable storage device further comprises instructions for causing a second processor in the secure region to:

decrypt the encrypted video data encoded in the first format;

transcode the video data in the secure region from the first format to the second format to generate a transcoded sample, wherein the transcoded sample comprises the video data transcoded to the second encoded format, a list comprising, for each video data region of the plurality of video data regions, an indicator of whether that video data region is to be encrypted or unencrypted, and an index table comprising at least one index and at least one subsample of video data comprising a header and a content;

re-encrypt the video data in the second format in accordance with the list of the transcoded sample, wherein re-encrypting the video data in the second encoded format in the secure region results in a re-encrypted sample, the re-encrypted sample comprising at least one encrypted video data region of the plurality of video data regions.

15. The computer-readable storage device of claim 14, further comprising instructions for causing the first processor to determine a mode for re-encrypting to be performed by the secure region and passing the mode to the secure region.

16. The computer-readable storage device of claim 14, further comprising instructions for causing the second processor to:

transfer the encrypted video data encoded in the first format from an application memory in the application region to a secure memory in the secure region that is not accessible by the application region; and transfer the encrypted video data encoded in the second format from the secure memory of the secure region to the application memory of the application region.

* * * * *